United States Patent
Jeong et al.

(10) Patent No.: US 9,411,582 B2
(45) Date of Patent: Aug. 9, 2016

(54) APPARATUS AND METHOD FOR PROCESSING INVALID OPERATION IN PROLOGUE OR EPILOGUE OF LOOP

(71) Applicants: Samsung Electronics Co., Ltd., Suwon-si (KR); Seoul National University R&DB Foundation, Seoul (KR)

(72) Inventors: Seong-Hun Jeong, Seoul (KR); Bernhard Egger, Seoul (KR); Won-Sub Kim, Anyang-si (KR)

(73) Assignees: Samsung Electronics Co., Ltd., Suwon-si (KR); Seoul Electronics University R&DB Foundation, Seoul (KR)

( * ) Notice: Subject to any disclaimer, the term of this patent is extended or adjusted under 35 U.S.C. 154(b) by 583 days.

(21) Appl. No.: 13/832,291

(22) Filed: Mar. 15, 2013

(65) Prior Publication Data
US 2013/0254517 A1  Sep. 26, 2013

(30) Foreign Application Priority Data
Mar. 26, 2012  (KR) .................. 10-2012-0030695

(51) Int. Cl.
| | | |
|---|---|---|
| *G06F 9/30* | (2006.01) | |
| *G06F 9/38* | (2006.01) | |
| *G06F 15/78* | (2006.01) | |
| *G06F 9/45* | (2006.01) | |

(52) U.S. Cl.
CPC ........ *G06F 9/30007* (2013.01); *G06F 9/30072* (2013.01); *G06F 9/30105* (2013.01); *G06F 9/3859* (2013.01); *G06F 8/443* (2013.01); *G06F 15/7867* (2013.01)

(58) Field of Classification Search
CPC ........... G06F 9/30007; G06F 9/30072; G06F 9/20105; G06F 9/3859; G06F 9/48; G06F 15/7867; G06F 8/443; G06F 9/30105
USPC ......................................... 717/150, 160, 161
See application file for complete search history.

(56) References Cited

U.S. PATENT DOCUMENTS

| | | | |
|---|---|---|---|
| 5,560,003 A | 9/1996 | Nilsen et al. | |
| 6,275,921 B1 | 8/2001 | Iwata et al. | |
| 6,925,550 B2 * | 8/2005 | Sprangle | G06F 9/3836 712/214 |
| 8,099,585 B2 * | 1/2012 | Colavin | G06F 9/30072 712/226 |
| 2002/0007451 A1 * | 1/2002 | Cho | G06F 11/3648 712/43 |
| 2003/0233643 A1 | 12/2003 | Thompson et al. | |
| 2004/0128473 A1 * | 7/2004 | May | G06F 9/30105 712/7 |
| 2008/0005730 A1 | 1/2008 | Inamdar | |
| 2009/0070552 A1 * | 3/2009 | Kanstein | G06F 15/7867 712/29 |

* cited by examiner

*Primary Examiner* — Idriss N Alrobaye
*Assistant Examiner* — Courtney Carmichael-Moody
(74) *Attorney, Agent, or Firm* — NSIP Law

(57) ABSTRACT

An apparatus for processing an invalid operation in a prologue and/or an epilogue of a loop includes a register file including a first region for storing a data validity value indicating whether data is valid or invalid, and a second region for storing the data; and a functional unit configured to determine whether an operation is valid or invalid based on a value of a first region of each of one or more input sources received from the register file, and output a destination including a value based on the value of the first region of each of the input sources.

14 Claims, 7 Drawing Sheets

APPARATUS AND METHOD FOR PROCESSING INVALID OPERATION IN PROLOGUE OR EPILOGUE OF LOOP

CROSS-REFERENCE TO RELATED APPLICATIONS

This application claims the benefit under 35 USC 119(a) of Korean Patent Application No. 10-2012-0030695 filed on Mar. 26, 2012, in the Korean Intellectual Property Office, the entire disclosure of which is incorporated herein by reference for all purposes.

BACKGROUND

1. Field

The following description relates to an apparatus and a method for processing an invalid operation in a prologue and/or an epilogue of a software pipelined loop.

2. Description of Related Art

Software pipelining is a technique used to divide software into stages and execute operations in a pipeline manner, thereby improve the processing performance. However, because a coarse-grained reconfigurable architecture (CGRA) processor schedules a program by exploiting modulo scheduling, an invalid operation may be included in a prologue and/or an epilogue of a loop.

Generally, the CGRA processor uses predicate information to guard an invalid operation in a prologue and/or an epilogue of a loop from changing a program status. "Guarding" refers to pre-processing to control the execution of an invalid operation, and more specifically, to control the invalid operation not to be written in a register file even when a functional unit actually executes the invalid operation. To use the predicate information, routing information of the CGRA for the predicate is required. A CGRA compiler is in charge of the computation of the predicate and the routing, which may cause the scheduling procedure of the compiler to be complicated. In the case of a kernel of a complex loop, the computation of the predicate and the routing may lead to the failure of scheduling.

SUMMARY

In one general aspect, an apparatus for processing an invalid operation in a prologue and/or an epilogue of a loop includes a register file including a first region for storing a data validity value indicating whether data is valid or invalid, and a second region for storing the data; and a functional unit configured to determine whether an operation is valid or invalid based on a value of a first region of each of one or more input sources received from the register file, and output a destination including a value based on the value of the first region of each of the input sources.

The functional unit may be further configured to determine whether the operation is valid or invalid by performing an AND operation on the value of the first region of each of the input sources.

The functional unit may be further configured to determine whether the operation is valid or invalid by performing an AND operation on a predicate and a result of the AND operation performed on the value of the first region of each of the input sources.

The apparatus may further include a control unit configured to process a write request to write the destination in the register file based on a value of a first region of the destination.

The control unit may be further configured to process the write request based on a result of performing an AND operation on the value of the first region of the destination and a write enable (WE) signal.

The control unit may be further configured to reset the first region of the register file in response to a reset request.

The control unit may be further configured to reset the first region of the register file except for a register value that is transferred from a very long instruction word (VLIW) mode to a coarse grained reconfigurable array (CGRA) mode.

In another general aspect, a method of processing an invalid operation in a prologue and/or an epilogue of a loop includes inputting one or more input sources to a functional unit from a register file including a first region for storing a data validity value indicating whether data is valid or invalid, and a second region for storing the data; determining whether an operation is valid or invalid based on a value of the first region of each of the input sources; and outputting a destination including a value based on the value of the first region of each of the input sources.

The determining may include determining whether the operation is valid or invalid by performing an AND operation on the value of the first region of each of the input sources.

The determining may further include determining whether the operation is valid or invalid by performing an AND operation on a predicate and a result of the AND operation performed on the value of the first region of each of the input sources.

The method may further include processing, in a control unit, a write request to write the destination in the register file based on a value of a first region of the destination.

The processing of the write request may include processing the write request based on a result of performing an AND operation on the value of the first region of the destination and a write enable (WE) signal.

In another general aspect, an apparatus for processing an invalid operation in a prologue and/or an epilogue of a loop includes a register file configured to store data, and data validity information indicating whether the data is valid or invalid; and a functional unit configured to receive an input source from the register file, the input source including data, and data validity information indicating whether the data of the input source is valid or invalid; perform an operation on the data of the input source; determine whether the operation is valid or invalid based on the data validity information of the input source; and output a destination including operation validity information indicating whether the operation is valid or invalid.

The functional unit may be further configured to determine whether the operation is valid or invalid by performing an operation on the data validity information of the input source; and the operation validity information of the destination may include a result of the operation performed on the data validity information of the input source.

The data of the input source may include a plurality of data bits; and the data validity information of the input source may include a data validity bit.

The destination further may include data resulting from performing the operation on the data of the input source.

The functional unit may be further configured to receive a plurality of input sources from the register file, each of the input sources including data, and data validity information indicating whether the data of the input source is valid or invalid; perform an operation on the data of all of the input sources; determine whether the operation is valid or invalid based on the data validity information of all the input sources; and output a destination including operation validity information indicating whether the operation is valid or invalid.

The functional unit may be further configured to determine whether the operation is valid or invalid by performing an AND operation on the data validity information of all of the input sources; and the operation validity information of the destination may include a result of the AND operation performed on the data validity information of all of the input sources.

The functional unit may be further configured to receive a predicate; receive an input source from the register file, the input source including data, and data validity information indicating whether the data of the input source is valid or invalid; perform an operation on the data of the input source; determine whether the operation is valid or invalid based on the predicate and the data validity information of the input source; and output a destination including operation validity information indicating whether the operation is valid or invalid.

The functional unit may be further configured to determine whether the operation is valid or invalid by performing an AND operation on the predicate and the data validity information of the input source; and the operation validity information of the destination may include a result of the AND operation performed on the predicate and the data validity information of the input source.

The apparatus may further include a control unit configured to process a write request to write the destination in the register file based on the operation validity information of the destination.

The control unit may be further configured to perform an AND operation on the operation validity information of the destination and a write enable (WE) signal in response to the write request; and determine whether to write the destination in the register file based on a result of the AND operation.

Other features and aspects will be apparent from the following detailed description, the drawings, and the claims.

DETAILED DESCRIPTION

Figure 1:
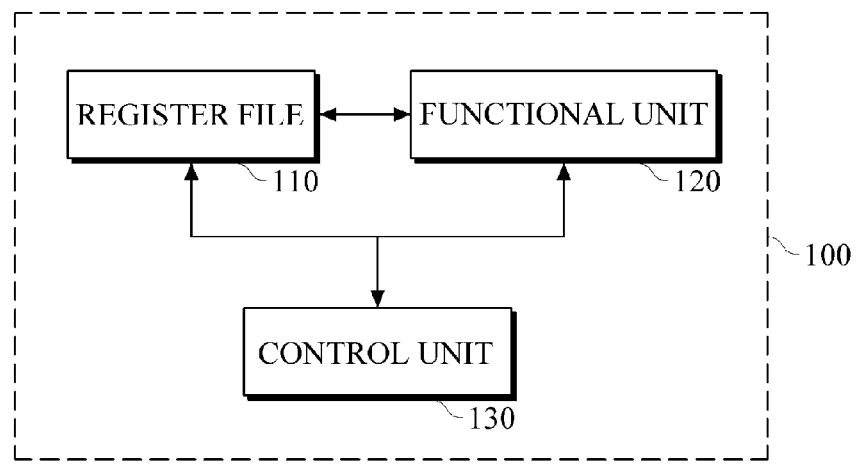
FIG. 1 is a diagram illustrating an example of an apparatus for processing an invalid operation in a prologue or an epilogue of a loop.

The following description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

FIG. 1 is a diagram illustrating an example of an apparatus for processing an invalid operation in a prologue or an epilogue of a loop. The apparatus 100 may be a coarse-grained reconfigurable architecture (CGRA) processor. A CGRA processor may include multiple functional units that are connected to an interconnection network. In addition, the CGRA processor may include a plurality of register files and latches.

A CGRA scheduler exploits software pipelining to map a kernel of a loop. Because the CGRA scheduler employs modulo scheduling to achieve a high utilization, a prologue or an epilogue of the loop may include an invalid operation. Generally, such an invalid operation is guarded using a predicate. However, in various examples described herein, a technique for guarding the invalid operation by expanding data in an effort to improve performance of a compiler is described.

Figure 2A:
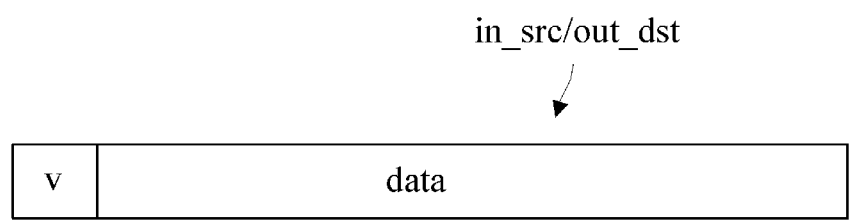
FIG. 2A is a diagram illustrating an example of augmented data.
Figure 2B:
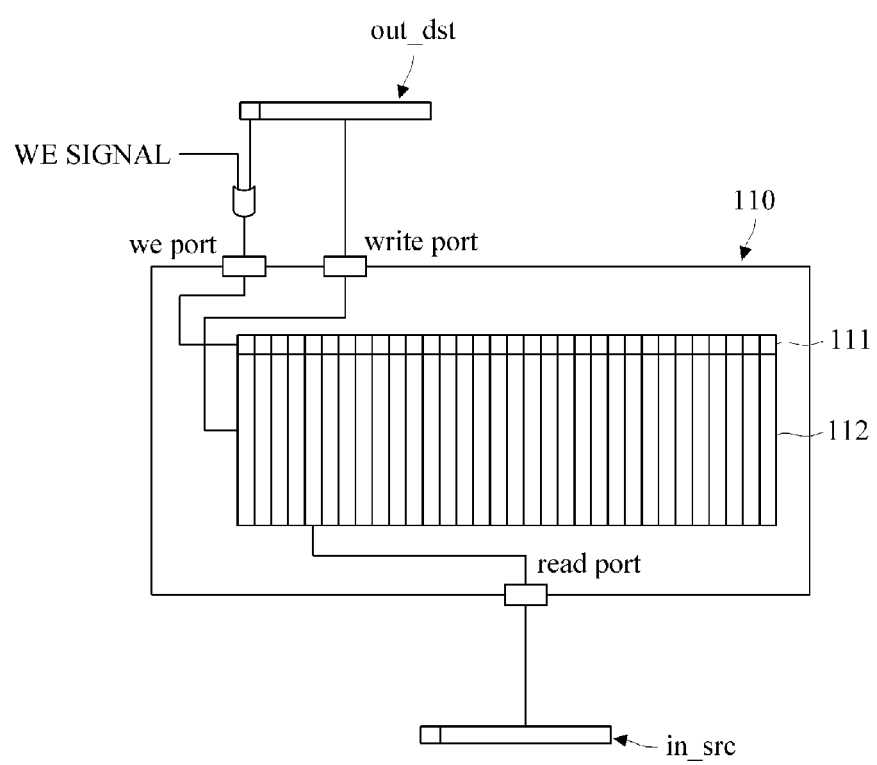
FIG. 2B is a diagram illustrating an example of a register file to support the augmented data.

FIG. 2A is a diagram illustrating an example of augmented data, and FIG. 2B is a diagram illustrating an example of a register file to support the augmented data. FIG. 2A illustrates an example of augmented data that consists of a data validity bit v (for example, 1 bit) and data bits (for example, 16, 32, 64, or 128 bits), wherein the data validity bit v represents a valid or invalid state (for example, valid—true, invalid—false) of the data, and the data bits represent the data itself. FIG. 2B illustrates an example of a register file 110 to support the augmented data.

The apparatus 100 for processing an invalid operation will now be described in detail with reference to FIGS. 1, 2A, and 2B. The apparatus 100 includes a register file 110, a functional unit 120, and a control unit 130. To support the augmented data illustrated in FIG. 2A, the register file 110 includes a first region 111 for storing a data validity value of the data, and a second region 112 for storing the data itself as illustrated in FIG. 2B.

The functional unit 120 determines whether an operation is valid or invalid based on a value of a first region of each of one or more input sources 'in_src'. In this example, the input source 'in_src' is received from the register file 110 or another functional unit 120 over the interconnection network. The functional unit 120 supports the augmented data. That is, the functional unit 120 is capable of not only guarding an invalid operation in a prologue and/or an epilogue of a loop using a predicate, but also determining the validity of the operation based on a value of a first region of each of one or more input sources, the value indicating a validity of data of the input source, and guarding the invalid operation.

In addition, the functional unit 120 creates a value of a first region of a destination 'out_dst' according to a result of the determining of whether the operation is valid or invalid, and outputs the destination 'out_dst' that includes the first region and a second region containing a result of an execution of the operation. If the operation is determined to be invalid, the validity of the operation, which is the value of the first region of the destination, is set to 'false'. On the contrary, if the operation is determined to be valid, the value of the first region of the destination is set to 'true'. The output destination 'out_dst' is transmitted to the register file 110 or another functional unit.

The control unit 130 processes a read request to read data from the register file 110 and a write request to write an operation result to the register file 110. The control unit 130 reads the data as it is from the register file 110 via a read port, regardless of the data validity value of the first region 111.

In response to a write request, the control unit 130 determines whether to write the destination 'out_dst' that is output from the functional unit 120 in the register file 110. In this example, the control unit 130 determines whether to write the destination 'out_dst' according to the value of the first region of the destination 'out_dst', that is, a data validity bit indicating a valid or invalid state of data resulting from the execution of the operation. For example, as shown in FIG. 2B, the control unit 130 writes the destination 'out_dst' in the register file 110 when a result of performing an AND operation on a value of the first region of the destination 'out_dst' and a write enable (WE) signal is 'true'. The value of the first region of the destination 'out_dst' is written in the first region 111 of the register file 110 via a write enable (WE) port, and a value of the second region of the destination 'out_dst' is written in the second region 112 of the register file 110 via a write port. On the contrary, if the result of an AND operation is 'false', the control unit does not write the destination 'out_dst' in the register file 110.

In addition, the control unit 130 resets the data validity bit in the first region 111 of the register file 110 according to a reset request generated simultaneously with the start of a loop of a CGRA. The data validity bit of register values are reset except for register values (for example, live-in values) that are transferred from a very long instruction word (VLIW) mode to a CGRA mode.

Figure 3:
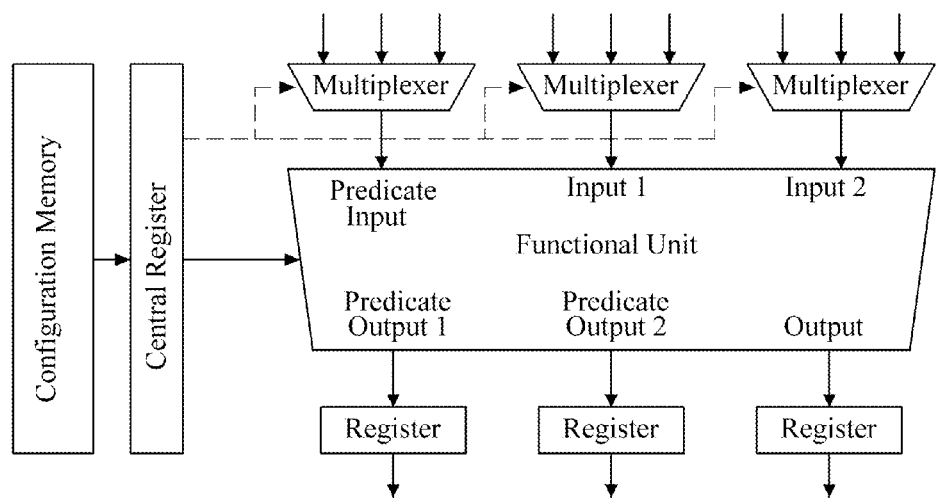
FIG. 3 is a diagram illustrating an example of a functional unit that guards an invalid operation using a predicate in a processor.
Figure 4:
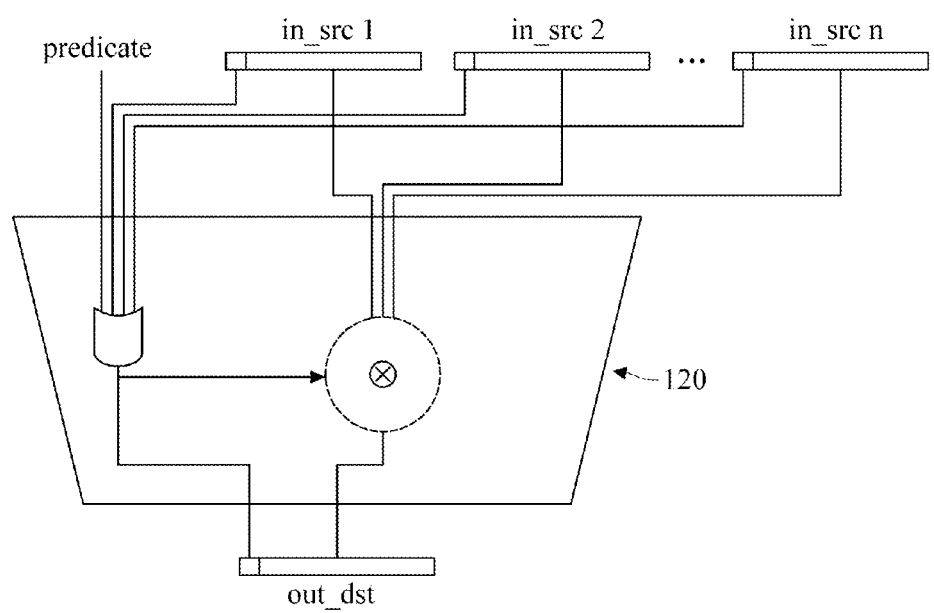
FIG. 4 is a diagram illustrating an example of a functional unit to support the augmented data.

FIG. 3 is a diagram illustrating an example of a functional unit that guards an invalid operation using a predicate in a processor. FIG. 4 is a diagram illustrating an example of a functional unit to support the augmented data. A method of a functional unit for guarding an invalid operation by exploiting a concept of augmented data will now be described with reference to FIGS. 3 and 4.

Referring to FIG. 3, a functional unit determines an invalid operation with respect to two input sources 'Input 1' and 'Input 2' and guards the invalid operation using predicate information 'Predicate Input'. To store the predicate information, a processor may be require a separate central register file. The predicate information is routed from the central register file to the functional unit. In addition, the functional unit also guards an invalid read/write operation of a configuration memory. However, as shown in FIG. 3, because a compiler is in charge of the generation of a predicate and the routing of the predicate information, the scheduling process of the compiler is very complicated, which may cause the compiler performance to be significantly degraded.

Referring to FIG. 4, a functional unit 120 receives n input sources 'in_src 1' to 'in_src n', each including a first region having a value which is a data validity bit indicating a validity of data, and a second region having a value which represents the data. The input sources are input from a register file 110 (refer to FIGS. 1 and 2B) or another functional unit.

The functional unit 120 performs an AND operation on the value of the first region of each of the n input sources 'in_src 1' to 'in_src n', and if a result of the AND operation is 'true', the functional unit 120 determines that an operation is a valid operation. If a result of the AND operation is 'false', the functional unit 120 determines that the operation is an invalid operation. That is, if the value of the first region of any of the input sources indicates that the input source includes invalid data, the operation is determined to be an invalid operation.

In another example, predicate information is created when necessary, and the validity of the operation is determined based on a result of performing an AND operation on the created predicate information and the value of the first region of each of the input sources 'in_src 1' to 'in_src n'.

The functional unit 120 performs the operation, and outputs a destination 'out_dst' that includes data resulting from the execution of the operation and the result of the determination of the validity of the operation. Specifically, a first region of the destination 'out_dst' stores a value 'true' if the operation is determined to be valid, and stores a value 'false' if the operation is determined to be invalid, and a second region of the destination 'out_dst' stores the data resulting from the execution of the operation.

Figure 5:
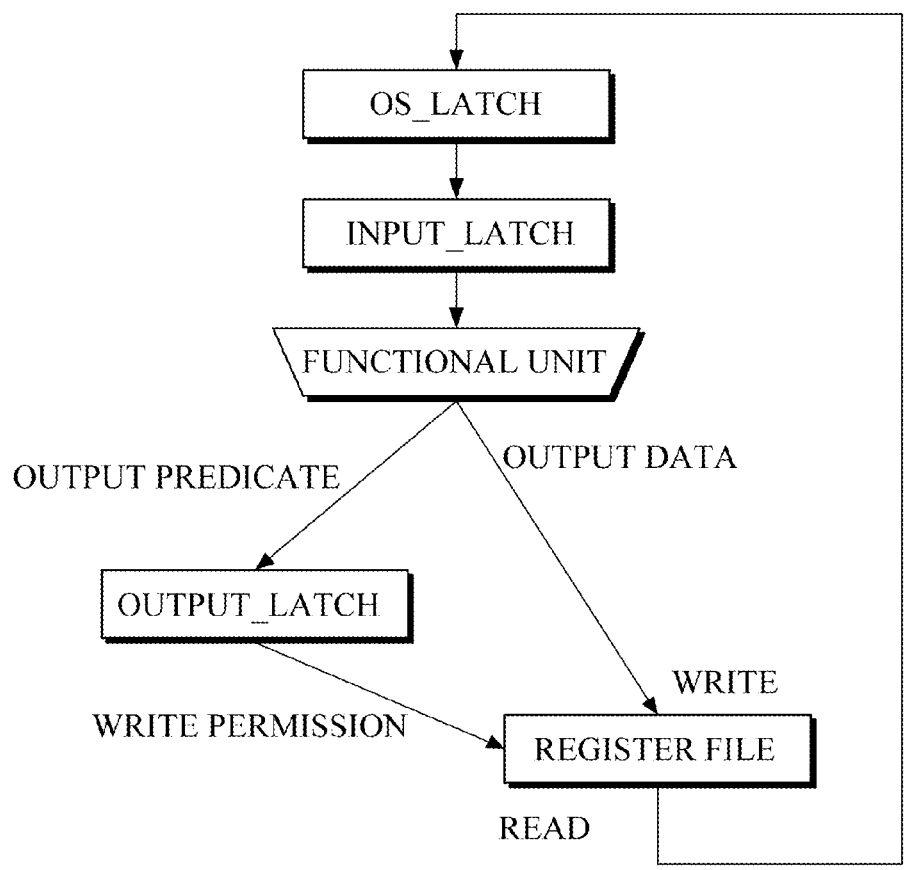
FIG. 5 is a diagram illustrating an example of a recurrence minimum initiation interval (MII) of a functional unit.

FIG. 5 is a diagram illustrating an example of a recurrence minimum initiation interval (MII) of a functional unit. An overhead of a compiler due to predicate routing may be determined with reference to FIG. 5. When a processor guards an operation using a predicate, the guarding process is sequentially performed by a functional unit, an output latch, a register file, an OS latch, an input latch, and a functional unit in order, and the guarding process takes 5 cycles (including 2 cycles of operation latency and 3 cycles of latch delay). When a processor guards an operation using the augmented data as shown in FIGS. 2A and 2B, the guarding process is sequentially performed by a functional unit, a register file, an OS latch, an input latch, and a functional unit, and takes 3 cycles (including 1 cycle of operation latency and 2 cycles of latch delay). Hence, it may be appreciated that a large amount of overhead is incurred when the compiler routes a predicate. Therefore, the performance of the compiler can be improved if the predicate is not used.

Figure 6:
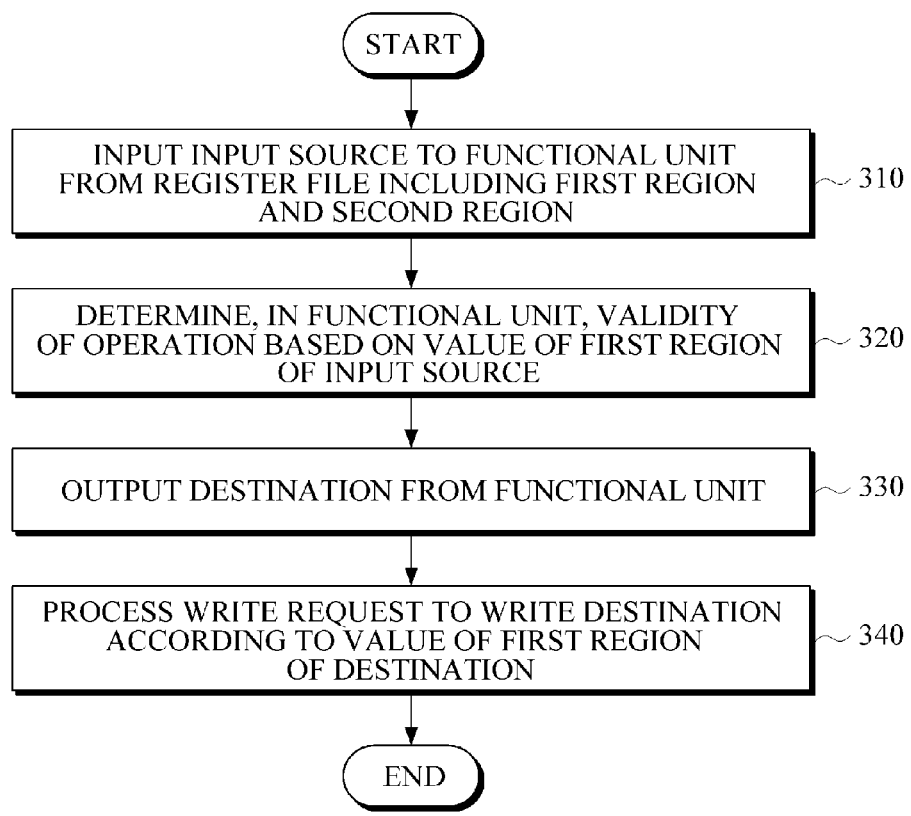
FIG. 6 is a flowchart illustrating an example of a method of processing an invalid operation in a prologue and/or an epilogue of a software pipelined loop.

FIG. 6 is a flowchart illustrating an example of a method of processing an invalid operation in a prologue and/or an epilogue of a software pipelined loop. Referring to FIG. 6 in conjunction with FIG. 1, in 310, one or more input sources 'in_src 1' to 'in_src n' are input to the functional unit 120. The control unit 130 reads the input sources 'in_src 1' to 'in_src n' from the register file 110 in response to a read request, and inputs the read input sources 'in_src 1' to 'in_src n' to the functional unit 120. The register file 110 includes a first region 111 that stores a data validity value of data and a second region 112 that stores a value of the data as shown in FIG. 2B. The control unit 130 reads the data itself regardless of the data validity value, that is, a value of the first region 111 of the register file 110, and inputs the read data to the functional unit 120.

Then, based on a value of the first region of each of the input sources 'in_src 1' to 'in_src n', the functional unit 120 determines whether an operation is valid or invalid in 320. Specifically, the functional unit 120 performs an AND operation on the value of the first region of each of the n input sources 'in_src 1' to 'in_src n'. If a result of the AND operation is 'true', the functional unit 120 determines the operation to be valid, and if a result of the AND operation is 'false', the functional unit 120 determines the operation to be invalid. In addition, predicate information may be independently created when necessary, and the functional unit 120 may perform an AND operation on the created predicate information and the value of the first region of each of the input sources 'in_src 1' to 'in_src n', and determine whether an operation is valid or invalid based on a result of the AND operation.

Then, the functional unit 120 executes the operation, and outputs a destination that includes data resulting from the execution of the operation and a result of the determination of the validity of the operation in operation 330. If the operation is determined to be valid, the functional unit 120 creates 'true' as a value of a first region of the destination 'out_dst', and if the operation is determined to be invalid, the functional unit 120 creates 'false' as the value of the first region of the destination 'out_dst'. The data resulting from the execution of the operation is included in a second region of the destination 'out_dst'.

Finally, the control unit 130 determines whether to write the destination 'out_dst' in the register file 110 based on the value of the first region of the destination 'out_dst', and processes a write request according to the determination result in 340. For example, referring back to FIG. 2B, the control unit 130 performs an AND operation on the value of the first region of the destination 'out_dst' and a write enable (WE) signal. If a result of the AND operation is 'true', the control unit 130 writes the destination 'out_dst' in the register file 110. In this example, the value of the first region of the destination 'out_dst' is written in the first region 111 of the register file 110, and the value of the second region of the destination 'out_dst' is written in the second region 112 of the register file 110. On the contrary, if a result of the AND operation is 'false', the destination 'out_dst' is not written in the register file 110.

The register file 110, the functional unit 120, and the control unit 130 described above may be implemented using one or more hardware components, one or more software components, or a combination of one or more hardware components and one or more software components.

A hardware component may be, for example, a physical device that physically performs one or more operations, but is not limited thereto. Examples of hardware components include read ports, write enable (WE) ports, write ports, AND gates, memories, registers, multiplexers, latches, operation elements, logic elements, arithmetic logic units (ALUs), field-programmable gate arrays (FPGAs), application-specific integrated circuits (ASICs), and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments for implementing the examples disclosed herein can be easily constructed by a programmer skilled in the art to which the examples pertain based on the drawings and their corresponding descriptions as provided herein.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An apparatus for processing an invalid operation in a prologue and/or an epilogue of a loop, the apparatus comprising:
    a register file comprising a first region for storing a data validity value indicating whether data is valid or invalid, and a second region for storing the data;
    a functional unit configured to determine whether an operation is valid or invalid based on a value of a first region of each of one or more input sources received from the register file, and to output a destination comprising a value based on the value of the first region of each of the input sources; and
    a control unit configured to reset the first region of the register file in response to a reset request
    wherein the functional unit is further configured to determine whether the operation is valid or invalid by performing an AND operation on the value of the first region of each of the input sources, and performing an AND operation on a predicate received from a central register file and a result of the AND operation performed on the value of the first region of the each of the input sources.

2. The apparatus of claim 1, wherein the control unit is further configured to process a write request to write the destination in the register file based on a value of a first region of the destination.

3. The apparatus of claim 2, wherein the control unit is further configured to process the write request based on a result of performing an AND operation on the value of the first region of the destination and a write enable (WE) signal.

4. The apparatus of claim 1, wherein the control unit is configured to reset the first region of the register file in response to the reset request when the reset request is generated simultaneously with a start of the loop.

5. The apparatus of claim 4, wherein the control unit is further configured to reset the first region of the register file except for a register value that is transferred from a very long instruction word (VLIW) mode to a coarse grained reconfigurable array (CGRA) mode.

6. A method of processing an invalid operation in a prologue and/or an epilogue of a loop, the method comprising:
    inputting one or more input sources to a functional unit from a register file, the register file comprising a first region for storing a data validity value indicating whether data is valid or invalid and a second region for storing the data;
    determining whether an operation is valid or invalid based on a value of the first region of each of the input sources;
    outputting a destination comprising a value based on the value of the first region of each of the input sources; and
    resetting the first region of the register file in response to a reset request,
    wherein the determine of whether the operation is valid or invalid further comprises performing an AND operation on the value of the first region of each of the input sources, and performing an AND operation on a predicate received from a central register file and a result of the AND operation performed on the value of the first region of each of the input sources.

7. The method of claim 6, further comprising processing, in a control unit, a write request to write the destination in the register file based on a value of a first region of the destination.

8. The method of claim 7, wherein the processing of the write request comprises processing the write request based on a result of performing an AND operation on the value of the first region of the destination and a write enable (WE) signal.

9. An apparatus for processing an invalid operation in a prologue and/or an epilogue of a loop, the apparatus comprising;
    a register file configured to store data and data validity information indicating whether the data is valid or invalid;
    a functional unit configured to:
        receive source plurality of input sources from the register file, each of the input sources comprising data and data validity information indicating whether the data of the input source is valid or invalid;
        perform an operation on the data of the received input sources;
        determine whether the operation is valid or invalid based on the data validity information of each of the input sources; and
        output a destination comprising operation validity information indicating whether the operation is valid or invalid; and
    a control unit configured to reset the data validity information of the register file in response to a reset request.
    wherein the functional unit is further configured to determine whether the operation is valid or invalid by performing an AND operation on the data validity information of each of the input sources, and performing an AND operation on a predicate received from a central register file and a result of the AND operation performed on the data validity information of each of the input sources.

10. The apparatus of claim 9,
    the operation validity information of the destination comprises a result of the AND operation performed on the data validity information of each of the input sources and the predicate received from the central register file.

11. The apparatus of claim 9, wherein the data of each of the input sources comprises a plurality of data bits; and
    the data validity information of the input sources comprises a data validity bit.

12. The apparatus of claim 9, wherein the destination further comprises data resulting from performing the operation on the data of the input source.

13. The apparatus of claim 9, wherein the control unit is further configured to process a write request to write the destination in the register file based on the operation validity information of the destination.

14. The apparatus of claim 13, wherein the control unit is further configured to:
perform an AND operation on the operation validity information of the destination and a write enable (WE) signal in response to the write request; and
determine whether to write the destination in the register file based on a result of the AND operation.

\* \* \* \* \*